United States Patent [19]
Hueftle

[11] 3,878,952
[45] Apr. 22, 1975

[54] SILAGE BUCKET HAVING A LOADING RAKE

[76] Inventor: Karl E. Hueftle, Rt. 2, Box 85, Cozad, Nebr. 69130

[22] Filed: May 10, 1974

[21] Appl. No.: 468,911

[52] U.S. Cl. ................ 214/145; 214/508; 214/509
[51] Int. Cl. ............................................. E02f 3/70
[58] Field of Search ....... 214/145, 508, 509; 299/76

[56] References Cited
UNITED STATES PATENTS

| | | | |
|---|---|---|---|
| 2,752,142 | 6/1956 | Joy | 299/76 |
| 2,755,092 | 7/1956 | Donahoe | 214/508 X |
| 2,905,346 | 9/1959 | Park et al. | 214/508 |
| 3,050,204 | 8/1962 | Haynes | 214/508 |
| 3,335,888 | 8/1967 | Kugler | 214/509 |
| 3,779,408 | 12/1973 | Ivie | 214/509 X |

Primary Examiner—Leo Friaglia
Attorney, Agent, or Firm—Zarley, Mckee, Thomte & Voorhees

[57] ABSTRACT

A front end loader on a tractor includes a bucket having a loading rake. A first arm extends upwardly and forwardly from the boom rearwardly of the bucket and is pivotly connected to a second arm extending downwardly and forwardly over the front of the bucket. A powered rotary cutting wheel is provided on the lower end of the second arm for raking silage or the like into the bucket. Individual power cylinders are provided for pivoting separately the first and second arms, the first arm being pivoted by a power cylinder extending between the first arm and the boom, while the second arm is pivoted by a power cylinder extending between the first arm and the second arm. Extension cutting wheels are provided for the outer ends of the rotary shaft on which the main cutting wheel is mounted to provide a cutting wheel corresponding to the width of the bucket.

8 Claims, 6 Drawing Figures

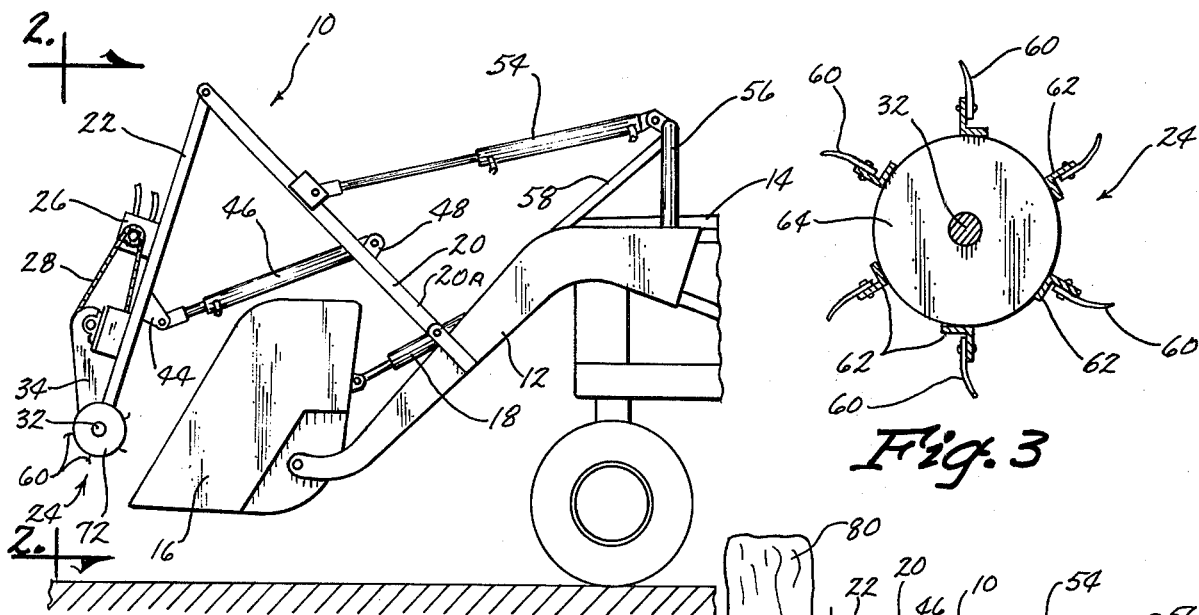
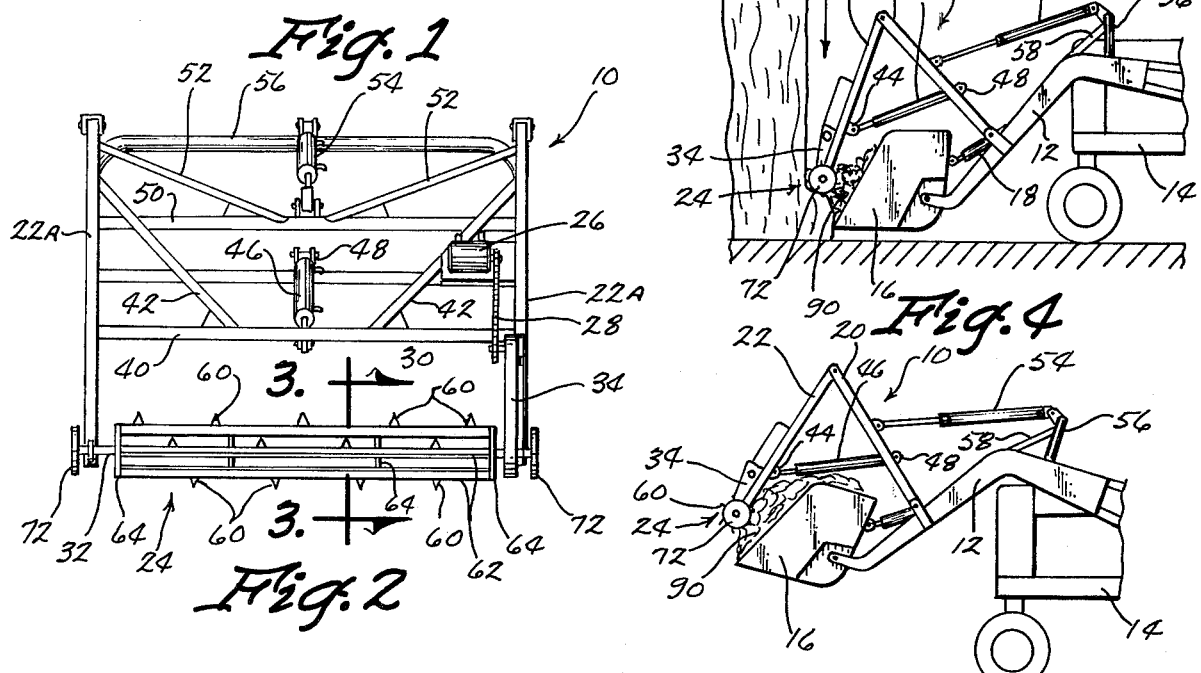
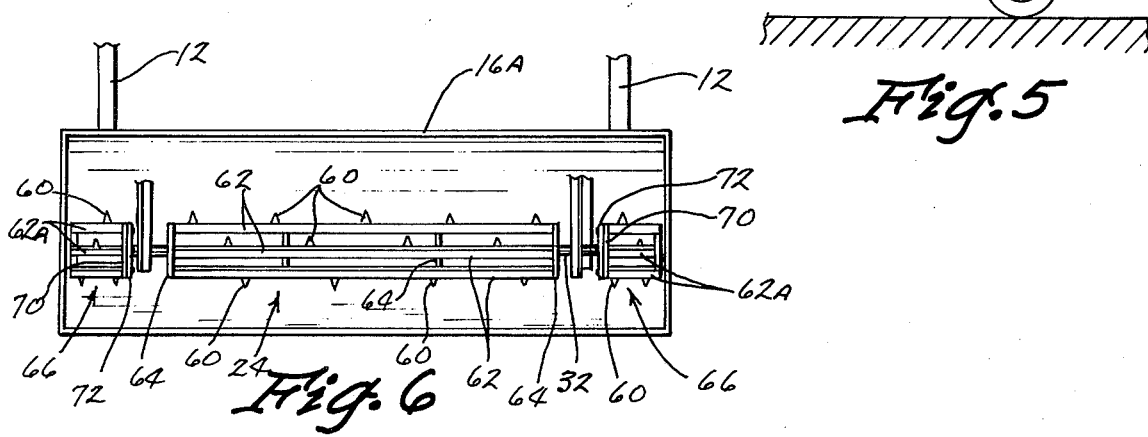

SILAGE BUCKET HAVING A LOADING RAKE

Silage materials are primarily stored in above-ground stacks to be later loaded into mixing and feed wagons and trucks. The silage settles into a caked structure, making it difficult to cut and load into a bucket on the front end of a front end loader mounted on a tractor. The loading rake for a front end loader bucket of this invention is capable of being mounted on any front end loader and includes a detachable pair of outwardly extending extension cutters to give the main cutting wheel extra width to correspond to the width of a loading bucket. Maximum adjustability is provided by the cutting wheel being mounted on an arm which is pivotally connected to another arm, in turn pivotally connected to the boom of the loader. A power cylinder extends from the outer arm into engagement with the inner arm for extending the outer arm relative to the inner arm, and a power cylinder extends from the inner arm rearwardly to engagement with a stand on the boom for pivoting the inner arm, and the outer arm having the cutter thereon. A drive means is carried on the outer arm for operating the cutting wheel, preferably hydraulicly, off of the hydraulic system of the tractor. With the loading rake of this invention it is possible to go to a stack of silage and through operation of the cutter, rake the silage material into the bucket for later unloading into a feed and mixing wagon or truck.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a fragmentary side elevation view of a tractor having a loader on which the loading rake of this invention is mounted;

FIG. 2 is a front elevational view taken along line 2—2 in FIG. 1.

FIG. 3 is cross-sectional view taken along the lines 3—3 in FIG. 2;

FIG. 4 is a reduced in scale side elevation view similar to FIG. 1 but showing the loading rake in operation;

FIG. 5 is a reduced in scale side elevation view similar to FIG. 1 but showing the rake assembly being used to retain the loaded material in the bucket during transport;

FIG. 6 is a front elevation view of a modified loading rake in association with the bucket.

The loading rake of this invention is referred to in FIG. 1 generally by the reference numeral 10 and is shown mounted on a front end loader having a boom 12 mounted on a tractor 14. The boom 12 includes a loading bucket 16, pivotally operated by a power cylinder 18 extending between the back side of the bucket and the boom 12.

The mounting structure for the rake 10 includes a first arm 20 pivotally connected rearwardly of the bucket 16 to the boom 12 and extending upwardly and forwardly where its outer end is pivotally connected to a second arm 22 which extends downwardly and forwardly. A rotary cutting wheel 24 is provided on the lower end of the second arm 22 and is driven by a hydraulic motor 26 carried on the second arm 22. The hydraulic motor is connected by a chain 28 to a sprocket 30, in turn connected to the cutter shaft 32 by an enclosed chain assembly 34.

The outer or second arm 22 includes side portions 22A and is connected by a cross member 40 having braces 42 extending to the side frame members 22A. An ear, 44, is connected to the cross member 40 and in turn is connected through a power cylinder 46 extending rearwardly into engagement with an ear 48 on the first arm 20. Specifically, the ear 48 is carried on a cross member 50, also having braces 52 extending outwardly into engagement with side frame members 20A. The first arm 20 is pivotally movable relative to the boom by a power cylinder 54 extending intermediate the length of the arm rearwardly into engagement with the top end of a stand 56 which bridges the front end of the tractor 14 such that the boom 12 may be raised and lowered without the stand interfering with the tractor 14. Stand 56 is reinforced by forwardly extending brace members 58 extending forwardly and downwardly into engagement with the side members of the boom 12.

As seen in FIG. 3, the cylindrical cutter 24 is provided with a plurality of curved knives 60 bolted into L-shaped mounting plates 62 extending between circular discs 64.

In FIG. 6, an alternate embodiment of the loading rake 10 is illustrated in combination with a front end loader bucket 16A which is wider than the bucket 16 of FIG. 1. The loading rake structure is the same except that extension cutting units 66 are provided to give the cutter 24 an effective length equal to the length of the bucket 16A. The extension cutters 66 include circular disc mounting plates 70 connected to outwardly disposed mounting plates 72 on the cutter shaft 32. The extension cutter units 66 also include the L-shaped elements 62A having the V-shaped curved teeth 60.

Thus, it is seen in operation that the loading rake of this invention may be mounted on any front end loader and driven up to a silage stack 80 where the bucket 16 is positioned next to the side of the stack. The hydraulic drive motor 26 is operated to rotate the cutting wheel 24 which is positioned against the side of the stack 80 by the power cylinders 46 and 54 which are selectively operated to pivot the arms 22 and 20 respectively. The loading operation can be accomplished in several different ways. The bucket may be positioned at a high elevation next to the stack 80 and then with the cutter rotating moved slowly downwardly all the time the cutter is breaking silage 80 into the bucket 16. Alternatively, the bucket can be positioned in a lower position and the hydraulic cylinders 46 and 54 are then operated moving the cutting wheel 24 downwardly towards the bucket all the while raking cut silage 90 into the bucket. As seen in FIG. 5, the bucket when filled is retained in a loaded condition by the outer arm 22 extending closely down against the silage 90. When it is desired to unload the bucket 16 the rake assembly may be moved out of the way by operation of the power cylinder 46, thereby allowing the bucket to be dumped by the power cylinder 18. The loading operation is then ready to be repeated.

When the loading rake of this invention is to be used on a loader having a wider bucket, such as the bucket 16A in FIG. 6, the extension cutting units 66 are bolted onto the disc mounting plate 72 carried on the cutter shaft 32 outwardly of the second arm 22 side frame members, as seen in FIGS. 2 and 6.

I claim:

1. The combination of a boom having a material bucket on its outer free end and a loading rake, said loading rake comprising,
   a first arm pivotally extending upwardly and outwardly over said bucket,
   a second arm pivotally connected to the outer end of said first arm and extending downwardly and forwardly on the open side of said bucket, and
   a cutting and raking means on the free end of said second arm for cutting material from a collection of material and raking it into said bucket.

2. The structure of claim 1 wherein said cutting and raking means is further defined as being a rotary cutting wheel extending the substantial width of such bucket and having a power means for rotating it.

3. The structure of claim 1 wherein a power cylinder extends between said first and second arms for pivoting said second arm to selectively position said cutter relative to the open side of said bucket.

4. The structure of claim 1 wherein said second arm has side members between which said rotary cutter is rotatably connected by a shaft extending outwardly of said side members in opposite directions and a rotary cutter is connected to each shaft to give the rotary an effective width which is greater than the distance between said side arms.

5. The structure of claim 1 wherein a power cylinder extends from said boom rearwardly of said first arm and is connected to said first arm outwardly of said boom for pivoting said first arm.

6. The structure of claim 5 wherein said connection between said boom and said power cylinder includes a stand on said boom with said cylinder being connected to the top end of said stand.

7. The structure of claim 5 wherein a power cylinder extends between said first and second arms for pivoting said second arm to selectively position said cutter relative to the open side of said bucket.

8. The structure of claim 7 wherein said bucket includes a power cylinder connected to said boom for pivoting said bucket relative to said cutter.

* * * * *